E. R. PERKINS.
AUTOMOBILE LOCK.
APPLICATION FILED SEPT. 27, 1920.

1,383,659.

Patented July 5, 1921.

Inventor
Earl R. Perkins.
By Harry D. Wallace
Attorney

UNITED STATES PATENT OFFICE.

EARL R. PERKINS, OF SYRACUSE, NEW YORK.

AUTOMOBILE-LOCK.

1,383,659. Specification of Letters Patent. Patented July 5, 1921.

Application filed September 27, 1920. Serial No. 412,922.

*To all whom it may concern:*

Be it known that I, EARL R. PERKINS, a citizen of the United States, residing at Syracuse, in the county of Onondaga and State of New York, have invented certain new and useful Improvements in Automobile-Locks, of which the following is a specification.

This invention relates to improvements in automobile locks, and has for its object to provide a novel and simple device of the class, which may be readily and quickly thrown into and out of engagement with certain of the controlling pedals for preventing unauthorized use of the same. And a particular object is to provide novel and effective means for preventing the theft of automobiles.

I attain these objects by the means set forth in the detailed description which follows, and as illustrated by the accompanying drawing, in which—

Figure 1:
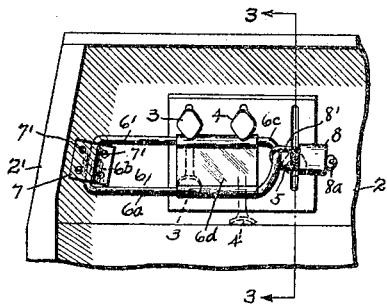
Figure 2:
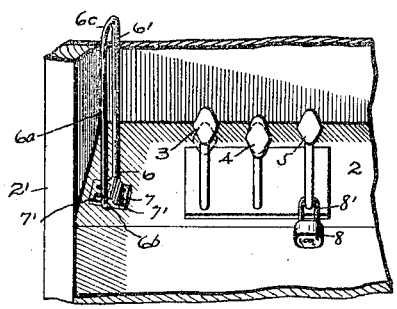
Figure 5:
Figure 3:
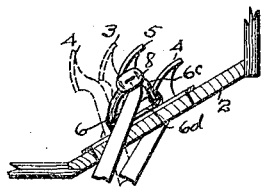
Figure 4:
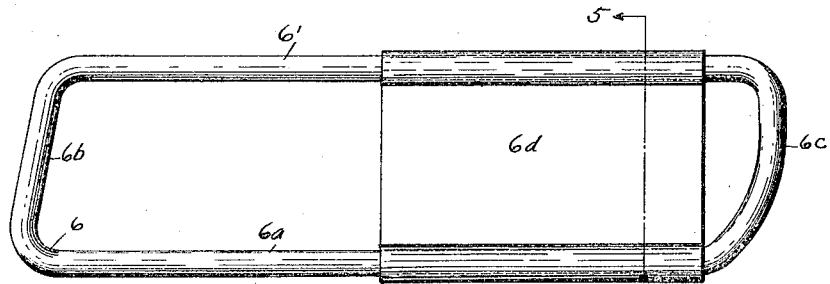
Figure 6:

Figure 1 is a fragmentary plan view of the forward portion of an automobile; showing my improvement in the locking position. Fig. 2 is a broken perspective view; showing the locking member released. Fig. 3 is a vertical longitudinal section, taken on line 3—3 of Fig. 1. Fig. 4 is an enlarged plan view of the locking member. Fig. 5 is a cross-section, taken on line 5—5 of Fig. 4. And Fig. 6 is an edge view of the locking member.

In the drawing, 2 represents the usual inclined footboard of the automobile, which supports and guides the three (Ford) controlling pedals, 3, 4 and 5. The pedal 3 is the clutch pedal, whose extreme rearward position indicates high speed, while its extreme forward position indicates the low speed. The pedal 4 is employed for reversing the automobile, and pedal 5 operates the brake.

My improved lock comprises an elongated stout wire loop or member 6, the opposite side rails 6' and 6ª of which are preferably parallel, while the ends 6ᵇ and 6ᶜ are preferably disposed at angles corresponding to that of the left side-wall 2' of the car. The end 6ᵇ is pivotally secured to the foot-board 2 by a hinge member 7, the latter being perforated to receive bolts 7' which pass through the board 2. The loop 6 is preferably hinged to the left side of the group of pedals and when not being used for locking the pedals, the said loop is swung upwardly toward the left side wall 2', as shown in Fig. 2. To lock the car against theft, the driver first swings the member 6 toward the right until a plate 6ᵈ, which is rigidly secured to and spans the side rails 6' and 6ª comes into contact with the tops of the pedals 3 and 4, when the latter are in the rearward or dotted position, shown in Fig. 3. The driver then places his foot upon the loop 6 and applies enough pressure thereon to force the loop downwardly, which moves the pedals 3 and 4 forwardly to the full line position, shown in Figs. 1 and 3. As the locking member 6 approaches the floor 2, the side rail 6' snaps beneath the rear-ends of the heads of the pedals 3 and 4, and holds them temporarily from being released. To complete the locking operation, the driver next slips the horseshoe-shaped bolt 8' of a padlock 8 over the slightly upturned end 6ᶜ of the loop 6, and also astraddle of the brake pedal 5 (see Figs. 1 and 3), after which he applies the padlock 8 to the bolt for preventing the releasing or moving of the locking member 6, or either of the pedals 3, 4 or 5, except by the use of a key, as 8ª. The simultaneous forward movement and setting of the pedals 3 and 4, shifts the forward and backward driving gears to their operative positions, and effectually prevents the car from being cranked for starting the engine, or from being trundled or run in either of said directions, and therefore theft of the car, by driving it away under its own power, or by towing, is rendered impossible. By bending the end 6ᶜ of the locking member upwardly, as shown in Figs. 3 and 6, the lock 8 is positioned directly beneath the head of the pedal 5. This prevents the pedal 5 from being moved in either direction, and also tends to hold the locking member with sufficient rigidity to prevent the detachment of the rail 6' from the heads of the pedals 3 and 4. The plate 6ᵈ being rigidly clenched to the rails 6' and 6ª, prevents the said rails from straddling the pedals during the locking operations, and said plate also prevents the said rails from flexing in case any one attempts to tamper with the locking device.

Having thus described my invention, what I claim as new and desire to secure by Letters Patent, is—

1. The combination with the body of an automobile and a plurality of controlling pedals; of an elongated loop pivoted near said pedals and movable in a transverse vertical plane, a plate carried by said loop adapted to frictionally engage the tops of two of said pedals, said loop when depressed adapted to simultaneously force said pedals forwardly into their operative positions, one rail of said loop adapted to snap beneath the heads of said pedals, and a padlock for securing the free end of said loop to the third pedal.

2. The combination with the body of an automobile and a plurality of controlling pedals, of a locking member pivoted for transverse movement in a vertical plane toward and away from said pedals, a plate carried by said member adapted to frictionally engage the two nearest pedals when said member is swung laterally and downwardly and to force said pedals forwardly into their operative positions, means for preventing the flexing of the side rails of said locking member, and means for locking the free end of said member to the farthermost pedal.

In testimony whereof I affix my signature.

EARL R. PERKINS.